No. 655,984.  
C. C. MIFFLIN.  
HUB.  
(Application filed June 5, 1900.)  
Patented Aug. 14, 1900.
(No Model.)
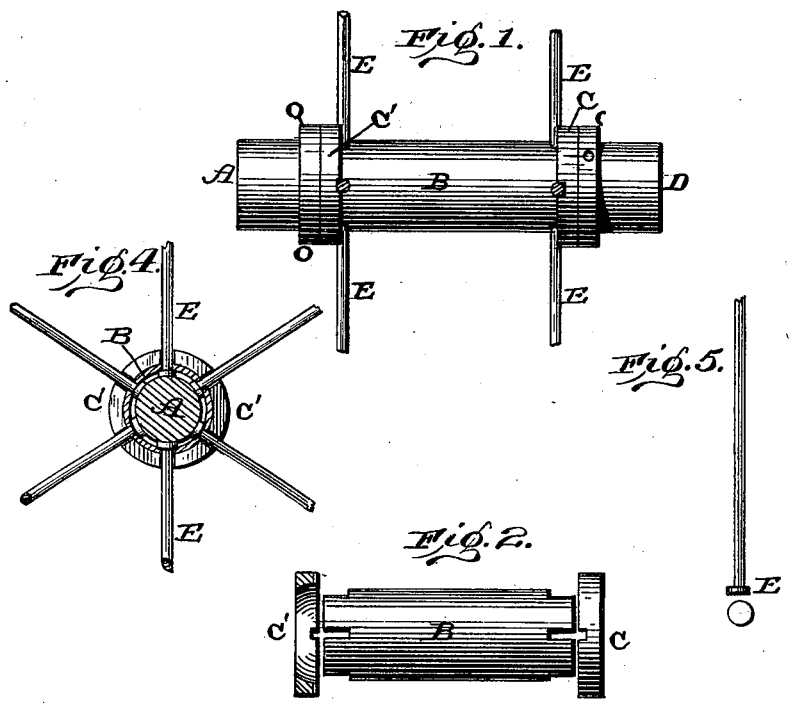
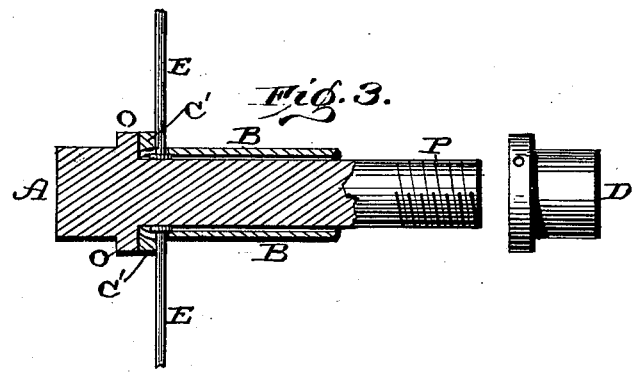
Witnesses  
E. W. Hart  
George Oltsch
Inventor  
Charles C. Mifflin  
By F. A. Lehmann.  
Attorney

UNITED STATES PATENT OFFICE.

CHARLES C. MIFFLIN, OF SOUTH BEND, INDIANA.

HUB.

SPECIFICATION forming part of Letters Patent No. 655,984, dated August 14, 1900.

Application filed June 5, 1900. Serial No. 19,120. (No model.)

*To all whom it may concern:*

Be it known that I, CHARLES C. MIFFLIN, a citizen of the United States, residing at South Bend, in the county of St. Joseph and State of Indiana, have invented certain new and useful Improvements in Hubs; and I do hereby declare the following to be a full, clear, and exact description of the invention, such as will enable others skilled in the art to which it appertains to make and use the same.

My invention relates to an improvement in hubs, and has for its object the quick and easy assembling of the parts, an expeditious and simple method of removing and replacing the spokes, and a hub which can be taken apart and put together by persons utterly devoid of mechanical skill.

My invention consists in an axle provided with a flange at one end and a screw-thread at the other and washers having beveled or concaved faces and notches to receive the inner ends of the spokes, combined with a sleeve which is placed between the washers and has in each of its ends open-ended slots to catch over the spokes and which sleeve has its ends contracted by the washers when tightened into place, as will be more fully described hereinafter.

In the accompanying drawings, which represent my invention, Figure 1 represents a side elevation of a hub embodying my invention complete, the spokes being broken away. Fig. 2 is a side elevation of the two washers and the sleeve, one of the washers being shown in section. Fig. 3 is a detail view, a portion of the axle, the sleeve, and one of the collars being shown in vertical section. Fig. 4 is a vertical cross-section taken through the center of the axle and looking toward the left. Fig. 5 shows detail figures of one of the spokes.

A represents an axle of a vehicle and which is provided with the flange O near one end and the screw-thread P at the other. The flange O is located a suitable distance from the end of the axle, and the screw-thread P at the other end extends sufficiently far inward to allow the nut D to be screwed securely into place and to clamp the other parts in position. Placed over the axle next to the flange O is a loose washer C', which has its inner face concaved or inclined outwardly toward the center of the axle and inside of which washer one end of the sleeve B, provided with open-ended slots to receive the inner ends of the spokes, extends. Also passed over the screw-threaded end of the axle and receiving the other slotted end of the sleeve B is a second washer C, which is forced into and retained in position by the nut D. Both of the washers have notches in their inner edges, so as to receive the inner ends of the spokes, and which ends are held in contact with the axle and between the washers and the sleeve. The inner surface of each of the washers is inclined, so that when the ends of the sleeves are forced into the washers by screwing the nut D into position the ends of the sleeve will be inclined inwardly toward the axle, as shown in Fig. 3, and thus made to clamp the heads upon the spokes E more securely than would be done if the ends of the sleeves merely extended into the washers and were not deflected out of a straight line. The spokes are of the usual construction, being provided with heads upon their inner ends, either as here shown or of any other shape that may be preferred, and which heads catch inside of the slotted ends of the sleeves, as shown. That portion of the inner ends of the spokes adjacent to the head, as seen in Fig. 3, is clamped upon opposite sides by the washer and by the sleeve at the same time that the inward bending of the ends of the sleeves forces the heads rigidly against the axle.

The great advantage of the construction here shown consists in the easy and rapid manner in which the parts of the hub can be put together and the quickness with which the spokes can be removed when injured and replaced by others. It is only necessary to remove the nut from the end of the axle, when the other parts drop out of position and every spoke can be instantly removed. In order to assemble the parts again either in first putting the hub together or after an injured spoke has been removed, it is only necessary to place the spokes against the collar C' and then place the sleeve upon the axle, so as to hold the spokes, then place the other spokes in position, place the washer C against the end of the sleeve, and then screw the nut upon the end of the axle. In screwing this nut into position the two washers will be forced over the ends of the sleeve and the spokes will be clamped rigidly in position, as above described. Putting this hub together and taking it apart requires no mechanical skill whatever, as it is a mere matter of placing the parts in position and then tightening up the nut.

Having thus described my invention, I claim—

1. A wheel consisting of a flanged axle, spokes having heads or enlargements, and means for clamping the heads of the spokes to the periphery of the axle, substantially as described.

2. The axle provided with a flange near one end, and a screw-thread at the other, and two washers having their inner surfaces inclined or beveled, combined with a sleeve having open-ended slots in its ends to receive the inner ends of the spokes, and a nut for forcing the washers over the ends of the sleeve and bending or forcing them inwardly toward the axle so that they clamp the heads of the spokes tightly against it, substantially as described.

3. In a hub, a sleeve having slotted ends which are adapted to be bent or forced inwardly over the heads of the spokes, and washers having inclined surfaces so that when the washers are forced over the ends of the sleeves, the sleeves will be curved or bent inwardly so as to clamp the heads of the spokes against the axle, substantially as set forth.

4. In a wheel, an axle having a flange, a slotted sleeve, and clamping-washers, combined with headed spokes, the parts being so assembled as to clamp the head of the spoke against the axle, substantially as set forth.

In testimony whereof I affix my signature in presence of two witnesses.

CHARLES C. MIFFLIN.

Witnesses:
GEORGE OLTSCH,
HUGO OLTSCH.